United States Patent Office 3,824,193
Patented July 16, 1974

3,824,193
ALKALINE REACTIVATION OF ALUMINA SUPPORTED PALLADIUM CATALYSTS
James E. Williams and Jean C. Fleischer, Kingsport, Tenn., assignors to Eastman Kodak Company, Rochester, N.Y.
No Drawing. Filed Mar. 30, 1972, Ser. No. 239,783
Int. Cl. B01j 11/18
U.S. Cl. 252—412                              5 Claims

ABSTRACT OF THE DISCLOSURE

A process is disclosed for reactivating alumina supported hydrogenation catalysts by treating the catalyst with either an alkali metal hydroxide or alkaline earth metal hydroxide in dilute aqueous solution to thoroughly wet the catalyst, then heating the treated catalyst to a temperature of between about 100° C. and about 500° C., and allowing the catalyst to cool.

---

This invention relates to a method of reactivating spent alumina-supported palladium hydrogenation catalysts.

In most catalytic hydrogenation processes in which organic materials are hydrogenated and in which metallic palladium catalysts are employed, the activity of the catalyst declines with continued use. In the hydrogenation of unsaturated aliphatic and aromatic organic esters, for example, a metallic palladium on alumina catalyst is commonly used. This is a relatively expensive catalyst, and slowly loses activity with continued use. A more desirable alternative to catalyst replacement is its regeneration to a condition which would be acceptable for further use. The regenerated catalyst should preferably be as active and selective to the desired product as a new catalyst.

It is well known in the art to use steam or hot gases to volatilize organic liquids and thus remove them from the catalysts. It is also known to subject spent or fouled catalysts to an oxidizing treatment to reactivate the catalyst. An object of the present invention is to provide an effective and improved method for reactivating spent hydrogenation catalysts comprising metallic palladium supported on alumina. A specific object is to provide a method for reactivating and improving selectivity of spent hydrogenation catalysts comprising spent palladium on alumina, which catalysts have become inactivated, or partially inactivated, through use in catalyzing the hydrogenation of organic esters. These and other objects will be apparent from the following description of the invention.

Although the invention is described herein broadly as being applicable to catalysts used in the hydrogenation of unsaturated aliphatic and aromatic esters, it is particularly applicable to catalysts used in the hydrogenation of such esters containing from about 3 to about 15 carbon atoms, such as dimethyl terephthalate, dimethyl isophthalate, monomethyl maleate, and dimethyl maleate.

The above objects are accomplished in accordance with this invention by a process which comprises treating the hydrogenation catalyst of metallic palladium supported on alumina with an aqueous solution of an alkyli metal hydroxide or alkaline earth metal hydroxide and subsequently heating the catalyst.

The process is preferably practiced by first draining the spent, or at least partially inactivated, palladium on alumina catalyst of excess liquid resulting from the hydrogenation process of unsaturated aliphatic or aromatic esters. The catalyst may then be washed with a volatile organic solvent such as acetone, methanol or ethyl acetate and dried, if desired, to allow it to be more easily handled. Although the washing step is preferred, it is not essential to the process according to this invention. Any volatile organic materials which remain on the catalyst are then removed by steaming or by stripping with hot nitrogen at a temperature above the boiling point of the solvent. The catalyst is then contacted with a dilute aqueous solution of an alkali metal hydroxide or alkaline earth metal hydroxide, thereby saturating or "wetting" the catalyst fully with the alkaline solution. As soon as thorough wetting is accomplished, excess solution is removed and the catalyst is heated in air, or a mixture of air and inert gas. Care should be taken during heating to avoid overheating which may cause loss of activity of the catalyst. The heating temperature may be within the range of from about 100° C. to about 500° C., preferably between about 200° C. and about 450° C. for a time sufficient to thoroughly dry the catalyst. The catalyst is subsequently cooled, or allowed to cool, and is then ready for reuse as a hydrogenation catalyst.

The caustic solution used to treat the catalyst in accordance with this invention is prepared by mixing the alkali metal hydroxide or alkaline earth metal hydroxide with water. The temperature of the solution while it is being used to treat the catalyst is not critical, and approximately room temperature and atmospheric pressure are perfectly suitable. The catalyst is treated, or brought into contact with the alkaline solution by dipping the catalyst in the aqueous alkaline solution, spraying the catalyst with the solution, pouring the solution into an container with the catalyst, or any other manner known to one skilled in the art. It is preferred that promptly after attaining a thorough wetting of the catalyst by the alkaline solution, the heating step be started to prevent the possibility of undesirable attack on the alumina by the alkaline solution. During heating, an exothermic reaction occurs. Following the reaction, the catalyst is cooled by suitable cooling means, or allowed to cool to about room temperature and it is ready for reuse in a hydrogenation reaction.

Suitable alkali metal hydroxides and alkaline earth metal hydroxides include sodium hydroxide, potassium hydroxide, lithium hydroxide, cesium hydroxide, barium hydroxide, and calcium hydroxide. Preferably, the alkaline material is used in concentrations of from about 0.1 to about 10 weight percent and most desirably from about 0.5 to about 5 weight percent of the solution.

The term "inactivated" or "spent" catalyst is used herein to mean a catalyst comprising metallic palladium supported on alumina, whose activity has been either completely or partially destroyed through use in catalyzing the hydrogenation on unsaturated aliphatic or aromatic ester. The term "reactivation" is used to mean the restoration, either partially or completely, of the effectiveness of such a spent catalyst to catalyze such hydrogenation reactions.

Surprisingly, it has been found that the effectiveness of new palladium on alumina catalyst is increased by use of the method according to the invention. When new catalyst is used, it is of course understood that draining, cleaning, etc., is unnecessary.

The procedure for determining the activity and selectivity of the catalyst will now be described. A one-liter autoclave is charged with 230 g. of unsaturated ester as called for in the examples. An 8.0 g. sample of palladium supported on alumina catalyst is suspended in a basket made of stainless steel screen by means of a support attached to the head of the autoclave, at a height such that the catalyst would normally be above the liquid level of the ester after it is melted. A stirrer provided inside the autoclave is started at low speed while the temperature inside the autoclave is increased to about 250° C. At this temperature, the stirrer speed is increased so that the vortex created would cause the liquid ester to impinge on the catalyst basket and therefore would contact the catalyst. Pressure inside the autoclave is brought to 2000 p.s.i.g. by the addition of hydrogen. After 2 hours, agitation with the stirrer is stopped, the reactor is cooled and dismantled. The product is removed, weighed and analyzed. Quantities by weight of unsaturated ester and hydrogenated material are determined by quantitative gas chromotography. The column used is 10 weight percent Carbowax 20M, a polyethylene glycol sold by Union Carbide, on Gas-Chrom Z, a packing support sold by Applied Science Laboratories, Inc. The column is 10 feet long and ¼-in. outside diameter tubing, and is operated at 174° C. Acid by-product is determined by titration with dilute base. Conversion of unsaturated ester to hydrogenated material and to acid, and yield of hydrogenated material are calculated as follows:

(a) Conversion of unsaturated ester to hydrogenated material = (moles hydrogenated material produced ÷ moles unsaturated ester in feed) × 100
(b) Conversion of unsaturated ester to acid = (moles acid produced ÷ moles unsaturated ester in feed) × 100
(c) Yield = (moles hydrogenated material produced ÷ moles unsaturated ester consumed) × 100

The following examples are submitted for a better understanding of the invention.

EXAMPLE I

Samples of unused 0.5% palladium on alumina catalyst from a typical lot are tested by the above procedure in the hydrogenation of dimethyl terephthalate (DMT) to dimethyl 1,4-cyclohexanedicarboxylate (DMCD). The results are shown in Table I, Example I, runs a–f.

EXAMPLE II

Samples of palladium on alumina catalyst which are partially deactivated through use in the hydrogenation of DMT to DMCD are obtained. A 175 g. portion of the catalyst is washed five times with 100 milliliter portions of acetone to remove visible organic deposits. The samples are then drained and dried under nitrogen at room temperature. The results of activity tests are shown in Table I, Example II, runs a and b.

EXAMPLE III

A 500 g. quantity of spent palladium on alumina catalyst is steamed for 4 hours with saturated steam at atmospheric pressure and dried for approximately 12 hours at 150° C. A 100 g. quantity of this catalyst is heated for 24 hours at 350° C. in a furnace. Samples are cooled and tested by the above procedure in the hydrogenation of DMT to DMCD. The results are shown in Table I, Example III, runs a–f.

EXAMPLE IV

A 100 g. portion of the steamed and dried catalyst of Example III is impregnated with a solution of 1.0 g. of sodium hydroxide dissolved in 35 milliliters water. Promptly after mixing the catalyst in the solution to accomplish thorough wetting, it is heated to remove excess water. Samples of the dried catalyst are calcined in a furnace at 350° C. for 24 hours, then cooled and tested as above. The results are shown in Table I, Example IV, runs a–f.

EXAMPLE V

A 300 gram portion of steamed and dried catalyst as in Example III is placed in a Vycor tube, a high temperature silica glass tube sold by Dow Corning having an outside diameter of 45 millimeters and a length of 24 inches. It is heated at 350° C. in a stream of 400 milliliters per minute nitrogen and 200 milliliters per minute air. The maximum temperature in the catalyst bed is 430° C. After 13 hours, samples of the catalyst are cooled and tested. Results are as shown in Table I, Example V, runs a–f.

EXAMPLE VI

A 300 gram portion of steamed and dried catalyst is impregnated with a solution of 3.0 grams sodium hydroxide in 110 milliliters water. The catalyst is then dried, and subsequently charged to the Vycor tube of Example V and heated in an air-nitrogen mixture as in Example V. Results of activity tests on samples of the regenerated catalyst are shown in Table I, Example VI, runs a–f.

TABLE I

| Ex. | Run No. | Catalyst description | Percent Converted to—Acid | Percent Converted to—DMCD | Yield of DMCD |
|---|---|---|---|---|---|
| I | (a) | New palladium on alumina catalyst. | 3.8 | 72.6 | 91.1 |
|   | (b) | ....do.... | 2.8 | 73.2 | 93.1 |
|   | (c) | ....do.... | 2.8 | 75.1 | 92.6 |
|   | (d) | ....do.... | 2.3 | 77.0 | 94.0 |
|   | (e) | ....do.... | 2.6 | 73.7 | 92.5 |
|   | (f) | ....do.... | 2.3 | 72.9 | 93.6 |
| II | (a) | Used palladium on alumina catalyst, acetone-washed. | 2.8 | 43.6 | 84.5 |
|   | (b) | ....do.... | 2.8 | 46.9 | 85.6 |
| III | (a) | Used palladium on alumina catalyst, steamed, and calcined at 350° C. | 5.5 | 69.2 | 87.7 |
|   | (b) | ....do.... | 4.3 | 70.3 | 90.2 |
|   | (c) | ....do.... | 4.5 | 68.0 | 89.4 |
|   | (d) | ....do.... | 4.3 | 69.4 | 89.7 |
|   | (e) | ....do.... | 4.3 | 67.5 | 89.8 |
|   | (f) | ....do.... | 4.2 | 66.8 | 90.1 |
| IV | (a) | Used palladium on alumina catalyst, steamed, NaOH-treated, calcined at 350° C. | 3.4 | 70.8 | 93.7 |
|   | (b) | ....do.... | 2.5 | 73.3 | 93.3 |
|   | (c) | ....do.... | 2.5 | 77.5 | 95.7 |
|   | (d) | ....do.... | 2.5 | 74.7 | 95.6 |
|   | (e) | ....do.... | 2.5 | 73.7 | 95.1 |
|   | (f) | ....do.... | 2.6 | 71.7 | 94.6 |
| V | (a) | Used palladium on alumina catalyst, steamed, and heated with air and nitrogen to about 350° C. | 5.8 | 74.4 | 88.8 |
|   | (b) | ....do.... | 5.4 | 72.7 | 89.5 |
|   | (c) | ....do.... | 5.0 | 75.3 | 89.1 |
|   | (d) | ....do.... | 5.0 | 72.6 | 90.6 |
|   | (e) | ....do.... | 4.5 | 70.1 | 89.7 |
|   | (f) | ....do.... | 4.8 | 66.7 | 89.5 |
| VI | (a) | Used palladium on alumina catalyst, steamed, NaOH-treated, and heated with air and nitrogen to about 350° C. | 2.5 | 74.3 | 95.6 |
|   | (b) | ....do.... | 3.0 | 77.7 | 95.6 |
|   | (c) | ....do.... | 3.1 | 75.3 | 95.1 |
|   | (d) | ....do.... | 3.3 | 69.0 | 94.4 |
|   | (e) | ....do.... | 3.1 | 65.5 | 92.8 |
|   | (f) | ....do.... | 3.1 | 63.3 | 92.7 |

EXAMPLE VII

Example I is repeated using new palladium on alumina catalyst for hydrogenation reaction as follows:

| | Unsaturated ester | Hydrogenated material | Temp., °C. | Percent Conversion to hydrogenated material | Yield of hydrogenated material |
|---|---|---|---|---|---|
| a | Monomethyl maleate | Monomethyl succinate | ca. 175 | ca. 70 | ca. 90–94 |
| b | Dimethyl maleate | Dimethyl succinate | ca. 75 | ca. 96 | ca. 96 |
| c | Dimethyl isophthalate | Dimethyl 1,3-cyclohexanedicarboxylate | ca. 250 | ca. 75 | ca. 93 |

EXAMPLE VIII

Example II is repeated using acetone-washed used palladium on alumina catalyst for hydrogenation reactions as follows:

| Unsaturated ester | Hydrogenated material | Temp., °C. | Percent Conversion to hydrogenated material | Percent Yield of hydrogenated material |
|---|---|---|---|---|
| a.... Monomethyl maleate... | Monomethyl succinate... | ca. 175 | ca. 40 | ca. 70 |
| b.... Dimethyl maleate...... | Dimethyl succinate...... | ca. 75 | ca. 50 | ca. 82 |
| c.... Dimethyl isophthalate. | Dimethyl, 13-cyclohexanedicarboxylate... | ca. 250 | ca. 42 | ca. 85 |

EXAMPLE IX

Example III is repeated using used palladium on alumina catalyst, steamed and calcined at 350° C. for hydrogenation reaction as follows:

| Unsaturated ester | Hydrogenated material | Temp., °C. | Percent Conversion to hydrogenated material | Percent Yield of hydrogenated material |
|---|---|---|---|---|
| a.... Monomethyl maleate... | Monomethyl succinate... | ca. 175 | ca. 72 | ca. 87 |
| b.... Dimethyl maleate...... | Dimethyl succinate...... | ca. 75 | ca. 93 | ca. 93 |
| c.... Dimethyl isophthalate. | Dimethyl 1,3-cyclohexanedicarbonate.... | ca. 250 | ca. 70 | ca. 88 |

EXAMPLE X

Example IV is repeated using spent palladium on alumina catalyst steamed, treated with NaOH and calcined at 350° C. for hydrogenation reactions as follows:

| Unsaturated ester | Hydrogenated material | Temp., °C. | Percent Conversion to hydrogenated material | Percent Yield of hydrogenated material |
|---|---|---|---|---|
| a.... Monomethyl maleate... | Monomethyl succinate... | ca. 175 | ca. 72 | ca. 94 |
| b.... Dimethyl maleate...... | Dimethyl succinate...... | ca. 75 | ca. 97 | ca. 98 |
| c.... Dimethyl isophthalate. | Dimethyl 1,3-cyclohexanedicarbonate.... | ca. 250 | ca. 75 | ca. 94 |

All parts and percentages used herein are by weight unless otherwise specified.

Although the invention has been described in considerable detail with particular reference to certain preferred embodiments thereof, variations and modifications can be effected within the spirit and scope of the invention.

We claim:

1. A process for the regeneration of spent palladium-on-alumina catalyst used in the hydrogenation of unsaturated aliphatic and aromatic organic esters which comprises the steps of:
   (a) removing liquids and volatile material which are associated with said catalyst as a result of its use in a hydrogenation process,
   (b) steaming the catalyst from step (a),
   (c) thoroughly saturating said catalyst with an aqueous solution of an alkaline material selected from the group consisting of alkali metal hydroxides and alkaline earth metal hydroxides in sufficient quantity to thoroughly wet said catalyst,
   (d) heating the alkaline treated catalyst in air or in a mixture of air and inert gas to a temperature of between about 100° C. and about 500° C., to dry the alkaline material in place, and
   (e) allowing the catalyst to cool.

2. A process according to Claim 1 wherein said alkaline material is sodium hydroxide.

3. A process according to Claim 1 wherein said alkaline material in aqueous solution comprises from about 0.1% to about 10% by weight of the solution.

4. A process according to Claim 1 wherein said alkaline-treated catalyst is heated to a temperature of between 200° C. and 450° C. in air.

5. A process according to Claim 1 which includes the step of washing said catalyst, prior to step (b), with an organic solvent selected from the group consisting of acetone, methanol, and ethyl acetate.

References Cited

UNITED STATES PATENTS

| 3,650,983 | 3/1972 | Miller | 252—412 |
| 2,925,391 | 2/1960 | Lait et al. | 252—412 |
| 3,480,558 | 11/1969 | Lum et al. | 252—416 |
| 3,214,385 | 10/1965 | Kolyer | 252—412 |
| 3,194,844 | 7/1965 | Silber et al. | 252—412 |

DANIEL E. WYMAN, Primary Examiner

P. E. KONOPKA, Assistant Examiner

U.S. Cl. X.R.

252—414, 420; 260—468 K, 485 R, 690